Patented June 16, 1936

2,044,553

UNITED STATES PATENT OFFICE 2,044,553

METHOD OF MAKING A LOW CONSISTENCY HYDRATED LIME

Francis C. Welch, Fond du Lac, Wis., assignor to The Western Lime & Cement Co., Milwaukee, Wis.

No Drawing. Application May 23, 1932, Serial No. 613,135

2 Claims. (Cl. 23—189)

The invention relates to improvements in methods of making a low consistency hydrated lime, and has for its primary object the provision of improved methods of the character indicated whereby a low consistency hydrated lime of great strength and plasticity will be produced.

Other objects will appear hereinafter.

The invention consists in the methods hereinafter described and claimed.

In carrying on the methods, I preferably use either high calcium or magnesium quicklime and hydrate the same by means of a solution in water of a substance which gives a hydrate requiring a minimum of water added thereto to reach desired consistency. The preferred substance for the purpose is calcium chloride. I have also found that small percentages of gypsum, epsom salts, sugar and gum arabic added to the hydrating water will give similar results to a greater or less extent, but for general purposes I find that calcium chloride is the most satisfactory.

A suitable formula for the use of magnesium quicklime is as follows:

| | Pounds |
|---|---|
| Quicklime | 1000 |
| Calcium chloride | 20 |
| Water | 280 |

A suitable formula for the use of high calcium quicklime is as follows:

| | Pounds |
|---|---|
| Quicklime | 1000 |
| Calcium chloride | 30 |
| Water | 450 |

I have used from 1% to 4% of chloride with good results, but find that substantially the proportions listed above are preferable, for general purposes. The high calcium lime takes more chloride because it naturally makes a bulkier hydrate of higher water ratio than the magnesium lime.

After the quicklime has been thoroughly hydrated by use of the solution indicated, the resultant hydrate is finely ground in a tube mill or similar grinding mill. The hydrated lime thus produced may be used in the usual way for making mortar, plaster, building blocks and the like.

The use of the calcium chloride in the hydrating water has a tendency to reduce the quantity of water necessary to add to the hydrated lime in mixing the same into a mortar, plaster or the like. I have found that briquets may be made of the neat or pure hydrate by the addition of but 42 c. c. of water to 100 grams of hydrate and that such briquets when tested had a strength of 45 lbs. per sq. in. in seven days. Briquets made of a 1 to 3 sanded mixture required but 15 c. c. of water per 100 grams of the mixture and when tested had a strength of 52 lbs. per sq. in. in seven days.

The strength of the mixture depends largely on the percentage or ratio of water required to give the necessary plasticity thereto. It will be found that hydrated lime prepared as indicated will require a minimum of water to obtain the necessary plasticity or consistency, and therefore the maximum of strength will be thus obtained. The addition of the chlorides or other compounds to the hydrating water alone will tend to reduce the water ratio or percentage, but when combined with the fine grinding of the hydrated lime, the water ratio or percentage is very greatly reduced, with corresponding increase in the strength of the resulting mortar, plaster or other material prepared therefrom.

While the use of chloride in hydrating the lime has a tendency to reduce the water necessary to reach the desired consistency, the results thus obtained are relatively inconsequential as the use of chloride alone will not have any material effect. However, by finely grinding the resulting hydrated lime, as in a tube mill, the particles of the hydrated lime will have the occluded air eliminated therefrom and are probably also somewhat flattened in shape so as to expose a greater surface per unit of weight for the water to act on, with the result that the required consistency and plasticity may thus be obtained with a minimum of water. Thus the conjoint use of the chloride in hydrating and the fine grinding of such hydrated lime produces an improved product which will require the addition of a minimum of water to produce desired consistency and plasticity.

While I have set forth in detail the preferred ingredients, proportions thereof and methods of use, these are capable of variation and modification without departing from the spirit of the invention. I therefore do not wish to be confined to the precise details disclosed but desire to avail myself of such variations and modifications as fall within the scope of the appended claims.

I claim:

1. The method of preparing a hydrated lime requiring a minimum of water to reach desired consistency and plasticity, which consists in hydrating quick lime in the presence of calcium chloride; and then finally grinding said hydrated lime while in neat condition.

2. The method of preparing a hydrated lime requiring a minimum of water to reach desired consistency and plasticity, which consists in hydrating quick lime in the presence of calcium chloride; and then finally grinding said hydrated lime in a tube mill while in neat condition.

FRANCIS C. WELCH.